(12) United States Patent
Bultemeier et al.

(10) Patent No.: US 9,580,178 B2
(45) Date of Patent: Feb. 28, 2017

(54) METHODS AND APPARATUSES FOR INTEGRATED NOISE CONTROL AND FLOW CONTROL IN AN AIRCRAFT ENVIRONMENTAL CONTROL SYSTEM

(71) Applicant: The Boeing Company, Huntington Beach, CA (US)

(72) Inventors: Eric James Bultemeier, Seattle, WA (US); Gail Mary Barker, Seattle, WA (US); Brian Dale Hlavka, Mukilteo, WA (US); Roderick M. Jones, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/702,407

(22) Filed: May 1, 2015

(65) Prior Publication Data
US 2016/0318614 A1 Nov. 3, 2016

(51) Int. Cl.
B64D 13/06 (2006.01)
(52) U.S. Cl.
CPC .................................. B64D 13/06 (2013.01)
(58) Field of Classification Search
CPC ....................................................... B64D 13/06
USPC ......................................................... 181/224
See application file for complete search history.

(56) References Cited

U.S. PATENT DOCUMENTS

| | | | | |
|---|---|---|---|---|
| 2,820,406 | A | * | 1/1958 | Argentieri .............. F24F 11/025 181/256 |
| 4,330,047 | A | * | 5/1982 | Ruspa ..................... F24F 13/08 181/224 |
| 4,896,588 | A | | 1/1990 | Monda et al. |
| 5,209,259 | A | | 5/1993 | Dear et al. |
| 5,728,980 | A | * | 3/1998 | Zarnick ................... E04F 17/04 181/224 |
| 5,929,396 | A | | 7/1999 | Awad |
| 6,413,159 | B1 | | 7/2002 | Bates, III et al. |

(Continued)

FOREIGN PATENT DOCUMENTS

| | | |
|---|---|---|
| EP | 2851298 | 3/2015 |
| GB | 893999 | 4/1962 |
| JP | 62228831 | 10/1987 |

OTHER PUBLICATIONS

English translation of the abstract of JP 62228831.
(Continued)

*Primary Examiner* — Forrest M Phillips
(74) *Attorney, Agent, or Firm* — DASCENZO Intellectual Property Law, P.C.

(57) ABSTRACT

Aircraft, environmental control systems, and air diffusers that may be used to create a quiet, comfortable environment within an aircraft cabin are disclosed. The air diffusers include a duct, a grille, and a porous flow conditioner positioned at least partially within an outlet plenum of the duct. The porous flow conditioner is configured to create backpressure and to reduce a velocity of air flowing out of the porous flow conditioner, relative to air flow unaffected by the porous flow conditioner. The porous flow conditioner may be configured to reduce noise generated by air flow through the air diffuser assembly, relative to air flow unaffected by the porous flow conditioner. The porous flow conditioner may be configured to reduce noise generated by air flow downstream of the porous flow conditioner.

20 Claims, 4 Drawing Sheets

(56) References Cited

U.S. PATENT DOCUMENTS

| | | |
|---|---|---|
| 6,920,959 B2 | 7/2005 | Han et al. |
| 7,100,356 B2 | 9/2006 | Han et al. |
| 7,802,651 B2 | 9/2010 | Park et al. |
| 8,240,429 B1* | 8/2012 | Singhal .................... H02K 5/20 |
| | | 181/212 |
| 2007/0157803 A1 | 7/2007 | McNeil et al. |
| 2008/0223652 A1* | 9/2008 | Dyck ...................... E04F 17/04 |
| | | 181/224 |
| 2009/0020358 A1* | 1/2009 | Derks .................. F16L 55/033 |
| | | 181/224 |
| 2009/0166126 A1* | 7/2009 | Patsouras ................ B29C 43/18 |
| | | 181/224 |
| 2009/0173571 A1 | 7/2009 | Keller |
| 2010/0078258 A1* | 4/2010 | Tanabe ................. G10K 11/172 |
| | | 181/224 |
| 2010/0154468 A1 | 6/2010 | Shaska et al. |
| 2010/0192616 A1 | 8/2010 | Gores et al. |
| 2011/0168482 A1* | 7/2011 | Merchant ................ F01D 25/30 |
| | | 181/213 |
| 2011/0294409 A1 | 12/2011 | Edom et al. |
| 2012/0267476 A1* | 10/2012 | Thomas ................. B64D 13/00 |
| | | 244/1 N |
| 2013/0327891 A1 | 12/2013 | Zhang et al. |
| 2014/0299406 A1* | 10/2014 | Librett .............. A61M 16/0069 |
| | | 181/224 |
| 2015/0063995 A1 | 3/2015 | Rivera et al. |
| 2015/0101883 A1* | 4/2015 | Xu ........................ F24F 13/082 |
| | | 181/224 |
| 2015/0115103 A1 | 4/2015 | Perkins et al. |
| 2015/0115104 A1 | 4/2015 | Perkins et al. |

OTHER PUBLICATIONS

U.S. Appl. No. 14/336,926, filed Jul. 21, 2014, Trudeau.

European Patent Office, Extended European Search Report for related European Patent Application No. 16155954, dated Jun. 30, 2016.

* cited by examiner

US 9,580,178 B2

METHODS AND APPARATUSES FOR INTEGRATED NOISE CONTROL AND FLOW CONTROL IN AN AIRCRAFT ENVIRONMENTAL CONTROL SYSTEM

FIELD

The present disclosure relates to methods and apparatuses for integrated noise control and flow control in an aircraft environmental control system.

BACKGROUND

Many aircraft are designed to fly at high altitudes, e.g., from 10,000 feet (ft) (about 3,000 meters (m)) to upwards of 41,000 ft (about 12,500 m), while providing a safe, comfortable cabin environment. To maintain this cabin environment, a typical aircraft includes an environmental control system, with appropriate pressure, temperature, and moisture regulation, to circulate fresh air within the cabin (e.g., the flight deck, also called the cockpit, the passenger cabin, and/or the cargo areas). An environmental control system may be referred to as an air handling system, an air circulation system, and/or an air conditioning system. An environmental control system may circulate outside air mixed with an amount of highly filtered air from the cabin. The combined outside and filtered air is ducted to the cabin and distributed to cabin outlets throughout the cabin. Air diffusers direct the ducted air into the cabin outlets.

Inside the cabin, cabin outlets are generally arranged along the side walls of the cabin and sometimes along the overhead. The air flows in generally circular patterns and exits through cabin outlets, often on either side of the cabin floor, and, on airplanes with overhead recirculation, the air may exit through overhead cabin outlets. For commercial aircraft, the FAA (Federal Aviation Administration) requires a minimum air flow and cabin pressure. For new aircraft, the minimum air flow is 0.55 pounds per minute (lbs/min) per occupant (about 250 grams per minute (g/min) per occupant) and the minimum cabin pressure is 0.75 bar (75 kilopascal (kPa)).

The cabin air flow is continuous and is used for maintaining a comfortable cabin temperature, pressurization, and/or overall air quality. Some portion of the air exiting the cabin is exhausted from the airplane through one or more outflow valves in the fuselage, which also controls the cabin pressure. The remaining portion is drawn through high efficiency filters, and then is recirculated with fresh outside air, as discussed.

For passenger comfort, air flow into the cabin should be quiet, relatively uniform, and generally unobtrusive. However, in addressing these needs, designers must balance weight and complexity with comfort.

SUMMARY

Aircraft, environmental control systems, and air diffusers that may be used to create a quiet, comfortable environment within an aircraft cabin are disclosed. The air diffusers include a duct, a grille, and a porous flow conditioner. The duct has a duct inlet, a duct outlet downstream of the duct inlet, and an outlet plenum at least partially defined by the duct outlet. The grille has a diffuser exit and a grille inlet upstream of the diffuser exit. The grille is coupled to the duct outlet with the grille inlet facing the duct outlet and the outlet plenum. The porous flow conditioner is positioned at least partially within the outlet plenum of the duct. The porous flow conditioner is configured to create backpressure in the duct and to reduce a velocity of air flowing out of the porous flow conditioner toward the diffuser exit, relative to air flow unaffected by the porous flow conditioner. The porous flow conditioner may be configured to reduce noise generated by air flow through the air diffuser assembly, relative to air flow unaffected by the porous flow conditioner. The porous flow conditioner may be configured to attenuate noise generated downstream of the porous flow conditioner.

DESCRIPTION

Figure 1:
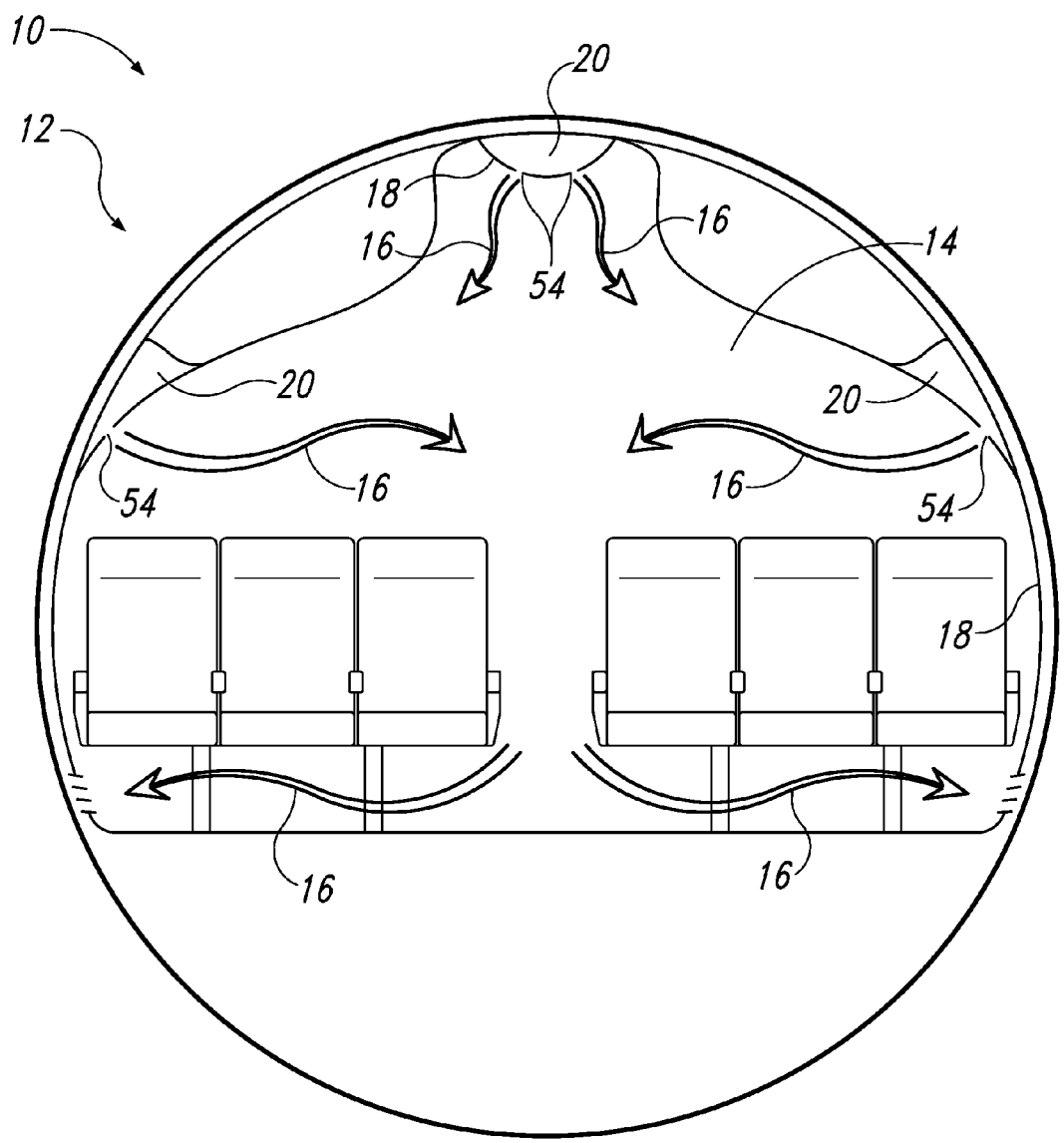
FIG. 1 is a cross-sectional schematic representation of an aircraft interior.

FIGS. 1-4 illustrate apparatuses for integrated noise control and flow control in an aircraft environmental control system. In general, in the drawings, elements that are likely to be included in a given embodiment are illustrated in solid lines, while elements that are optional or alternatives are illustrated in dashed lines. However, elements that are illustrated in solid lines are not essential to all embodiments of the present disclosure, and an element shown in solid lines may be omitted from a particular embodiment without departing from the scope of the present disclosure. Elements that serve a similar, or at least substantially similar, purpose are labeled with numbers consistent among the figures. Like numbers in each of the figures, and the corresponding elements, may not be discussed in detail herein with reference to each of the figures. Similarly, all elements may not be labeled or shown in each of the figures, but reference numerals associated therewith may be used for consistency. Elements, components, and/or features that are discussed with reference to one or more of the figures may be included in and/or used with any of the figures without departing from the scope of the present disclosure.

FIG. 1 is a cross-sectional schematic representation of an aircraft interior illustrating where and how air diffuser assemblies 20 may be employed within an aircraft 10 to circulate air in an aircraft cabin 14. Air flow is indicated by arrows 16. Air diffuser assemblies 20 are typically part of an environmental control system 12, sometimes referred to as an air conditioning system, on board the aircraft 10. The environmental control system 12 may include an air conditioning pack and/or a cold air unit. The environmental control system 12 circulates air within the aircraft cabin 14 by providing air flow to air diffuser assemblies 20 fluidically coupled to the aircraft cabin 14. Air diffuser assemblies 20 are located at the end of the air delivery pathways where air enters the aircraft cabin 14. The air from the environmental control system 12 may flow into the aircraft cabin 14 through diffuser exits 54 (also called vents), typically along the side walls and/or along the overhead of the aircraft cabin 14 (e.g., under the stow bins). The environmental control system 12 may supply air to all occupants, including passengers and crew. Air diffuser assemblies 20 may be configured to supply air to the cabin 14 or a portion of the cabin 14, e.g., the passenger cabin, the flight deck, and/or the cargo areas.

Aircraft 10 may be configured to transport one or more occupants (crew and passengers). For example, commercial aircraft may be configured to transport up to several hundred passengers. Several air diffuser assemblies 20 may be distributed along the aircraft cabin 14 to provide relatively uniform flow of fresh air to all occupants.

Air diffuser assemblies 20 may be configured to fit within the space constraints of an aircraft 10 and/or aircraft cabin 14. Typically, an environmental control system 12 has interior ductwork (air conduits) running along the length of the aircraft 10 fuselage, often along the interior walls and/or near the overhead in commercial transport aircraft 10. The air conduits are typically outside the aircraft cabin 14 (e.g., outside the passenger space) but within the fuselage. Air diffuser assemblies 20 may be connected to the ductwork along the length of the fuselage and may redirect some of the air flowing in the air conduits into the aircraft cabin 14. Air diffuser assemblies 20 may be relatively compact to fit behind cabin walls 18 with the air conduits. Further, air diffuser assemblies 20 may redirect air from the air conduits at a significant angle relative to the central air flow path through the air conduits. For example, an air diffuser assembly 20 may redirect air flow at an angle of about 90°. An air diffuser assembly 20 that redirects air flow at a significant angle may be referred to as bent, turned, and/or curved.

Air diffuser assemblies 20 are configured to supply air as part of an environmental control system 12 at a rate to maintain the comfort and health of occupants. FAA regulations currently require a minimum air flow of 0.55 lbs/min per occupant (about 250 g/min per occupant). When flying, aircraft with pressurized cabins typically maintain the air pressure at the equivalent of about 6,000-8,000 ft altitude (about 1,800-2,400 m), which is about 0.75-0.80 bar (about 75-80 kPa). At 75 kPa and a comfortable cabin temperature of about 20-25° C., the FAA requirement corresponds to an air flow of about 10 cubic feet per minute ($ft^3$/min) per occupant (about 280 liters per minute (L/min) per occupant).

Air diffuser assemblies 20 may be employed in an aircraft 10 and/or an environmental system 12 to circulate air in an aircraft cabin 14. Circulating may include supplying air to an aircraft cabin 14 through the air diffuser assemblies 20. The air diffuser assemblies 20 may be configured to supply the aircraft cabin 14 with a generally uniform air flow and/or with an air flow of at least 250 g/min per rated occupant. Further, circulating may include maintaining an air pressure in an aircraft cabin 14 sufficient for comfortable travel. For example, the air pressure may be greater than 60 kPa, greater than 70 kPa, greater than 75 kPa, greater than 80 kPa, greater than 90 kPa, greater than 100 kPa, less than 120 kPa, less than 100 kPa, less than 80 kPa, 70-80 kPa, 70-90 kPa, 70-102 kPa, about 90 kPa, about 80 kPa, and/or about 75 kPa. Unless stated clearly otherwise, all air pressure values are absolute air pressure values.

An aircraft 10 and/or an environmental control system 12 generally incorporates a plurality of air diffuser assemblies 20 to handle the required air flow and/or to distribute the air flow relatively equally among the occupants. Each air diffuser assembly 20, and associated air handling components, adds weight and complexity to an aircraft 10. Hence, an aircraft 10 may be designed to minimize the number of air diffuser assemblies 20 (thus saving weight and, ultimately, fuel and maintenance costs). Since an aircraft 10 is rated for a certain number of occupants, including crew and passengers, a smaller number of air diffuser assemblies 20 increases the volumetric and/or mass flow of the air that each air diffuser assembly 20 handles such that at least the minimum flow is achieved. The aircraft 10 may incorporate less than one air diffuser assembly 20 for every rated occupant, for every two rated occupants, for every three rated occupants, and/or for more rated occupants. For example, the aircraft 10 may include at most 1, at most 0.5, at most 0.33, at most 0.25, about 0.5, about 0.33, and/or about 0.25 air diffuser assemblies 20 per rated occupant. The number of rated occupants may be the number of occupants the aircraft is designed and/or certified to carry, and/or may be the number of occupants that an isolated space (such as the flight deck or cargo hold) is designed and/or certified to hold.

Air diffuser assemblies 20 may be configured to handle air flow of about the required rate or greater. For example, air diffuser assemblies 20 may be configured to flow air at greater than 200 g/min, greater than 500 g/min, less than 1,500 g/min, less than 1,000 g/min, greater than 200 L/min, greater than 500 L/min, less than 2,000 L/min, and/or less than 1,500 L/min. Additionally or alternatively, air diffuser assemblies 20 may be configured to admit air flow into the air diffuser assembly 20 and/or emit air flow out of the air diffuser assembly 20 at a velocity of greater than 1 m/s, greater than 2 m/s, less than 10 m/s, and/or less than 5 m/s.

Air diffuser assemblies 20 may be configured, each independently, to supply air at a substantially constant volumetric flow rate, mass flow rate, pressure, and/or flow velocity into the aircraft cabin 14, provided that the environmental control system 12 is supplying a minimum threshold of air (volume, mass, and/or pressure) to each air diffuser assembly 20. Thus, the environmental control system 12 may be configured to control the supply of air into the aircraft cabin 14 at least partially through the configuration of the air diffuser assemblies 20.

Air diffuser assemblies 20 may be configured and/or used to establish a relatively quiet aircraft cabin environment by creating a sound level not substantially more than other ambient noise in an aircraft cabin 14, at least at some frequencies that interfere with speech and/or at high frequencies.

Hence, air diffuser assemblies 20 may be called quiet air diffuser assemblies and quiet cabin air diffuser assemblies. At higher flow rates (e.g., greater than 200 g/min), conventional environmental control systems with conventional air diffuser assemblies may contribute noise to aircraft cabins. However, the air diffuser assemblies 20 of the present disclosure may be configured to provide quiet air flow, even at high flow rates, without compromising the typical space and weight constraints of conventional air diffuser assemblies.

Aircraft cabins 14 may have many noise sources, particularly when the aircraft 10 is flying. Air diffuser assemblies 20 may be configured to contribute little to the overall sound level in an aircraft cabin 14. The sound level from an air diffuser assembly 20 in use may be less than 20 A-weighted decibels (dBA), less than 10 dBA, less than 5 dBA, less than 3 dBA, less than 2 dBA, or less than 1 dBA more than other ambient noise in aircraft cabin 14, at least at particular frequencies. For comparison, typical ambient noise in an aircraft cabin such as aircraft cabin 14 may be greater than 45 dBA, greater than 50 dBA, greater than 55 dBA, greater than 60 dBA, greater than 65 dBA, greater than 70 dBA, greater than 75 dBA, greater than 80 dBA, and/or greater than 85 dBA. The sound level contribution from an air diffuser assembly 20 may include frequencies of 0.1 kilohertz (kHz), 0.2 kHz, 0.5 kHz, 1 kHz, 2 kHz, 3 kHz, 4 kHz, 5 kHz, 8 kHz, 10 kHz, 12 kHz, 15 kHz, 20 kHz, 0.1-10 kHz, 0.5-4 kHz, 1-4 kHz, 2-4 kHz, 3-10 kHz, 5-10 kHz, greater than 5 kHz, and/or greater than 8 kHz. An alternate measure of interfering sound level is the speech interference level (SIL). The SIL is the arithmetic mean of the sound levels of a noise at three bands with center frequencies of 1 kHz, 2 kHz, and 4 kHz. These bands contain the frequencies that are important for speech communication. The SIL of an air diffuser assembly 20 in use may be less than 55 dBA, less than 52 dBA, less than 50 dBA, less than 48 dBA, less than 46 dBA, or less than 44 dBA.

Air diffuser assemblies 20 may be configured and/or used to establish backpressure in the environmental control system 12. Air diffuser assemblies 20 may establish enough backpressure to reduce the number, complexity, and/or weight of upstream flow restrictors within the environmental control system 12. Hence, an aircraft 10 with air diffuser assemblies 20 may have a reduced weight and, ultimately, reduced fuel and maintenance costs. Air diffuser assemblies 20 may be configured to create and/or maintain an air pressure differential (across the air diffuser assembly 20) of less than 20 kPa, less than 10 kPa, less than 5 kPa, less than 2 kPa, less than 1 kPa, greater than 0.5 kPa, greater than 1 kPa, and/or greater than 2 kPa when an air flow into the air diffuser assembly 20 is at a predefined velocity (such as 1 m/s, 2 m/s, or 5 m/s), volumetric flow rate (such as 240 L/min or 500 L/min), mass flow rate (such as 250 g/min or 500 g/min), and/or input pressure (such as 80 kPa, 90 kPa, or 100 kPa, 120 kPa). Air diffuser assemblies 20 may be configured to admit air at an input air pressure of greater than 60 kPa, greater than 70 kPa, greater than 80 kPa, greater than 90 kPa, greater than 100 kPa, less than 150 kPa, less than 120 kPa, less than 100 kPa, and/or less than 90 kPa. Air diffuser assemblies 20 may be configured to emit air at an output air pressure of greater than 60 kPa, greater than 70 kPa, greater than 80 kPa, greater than 90 kPa, greater than 100 kPa, less than 120 kPa, less than 100 kPa, less than 90 kPa, and/or less than 80 kPa.

Figure 2:
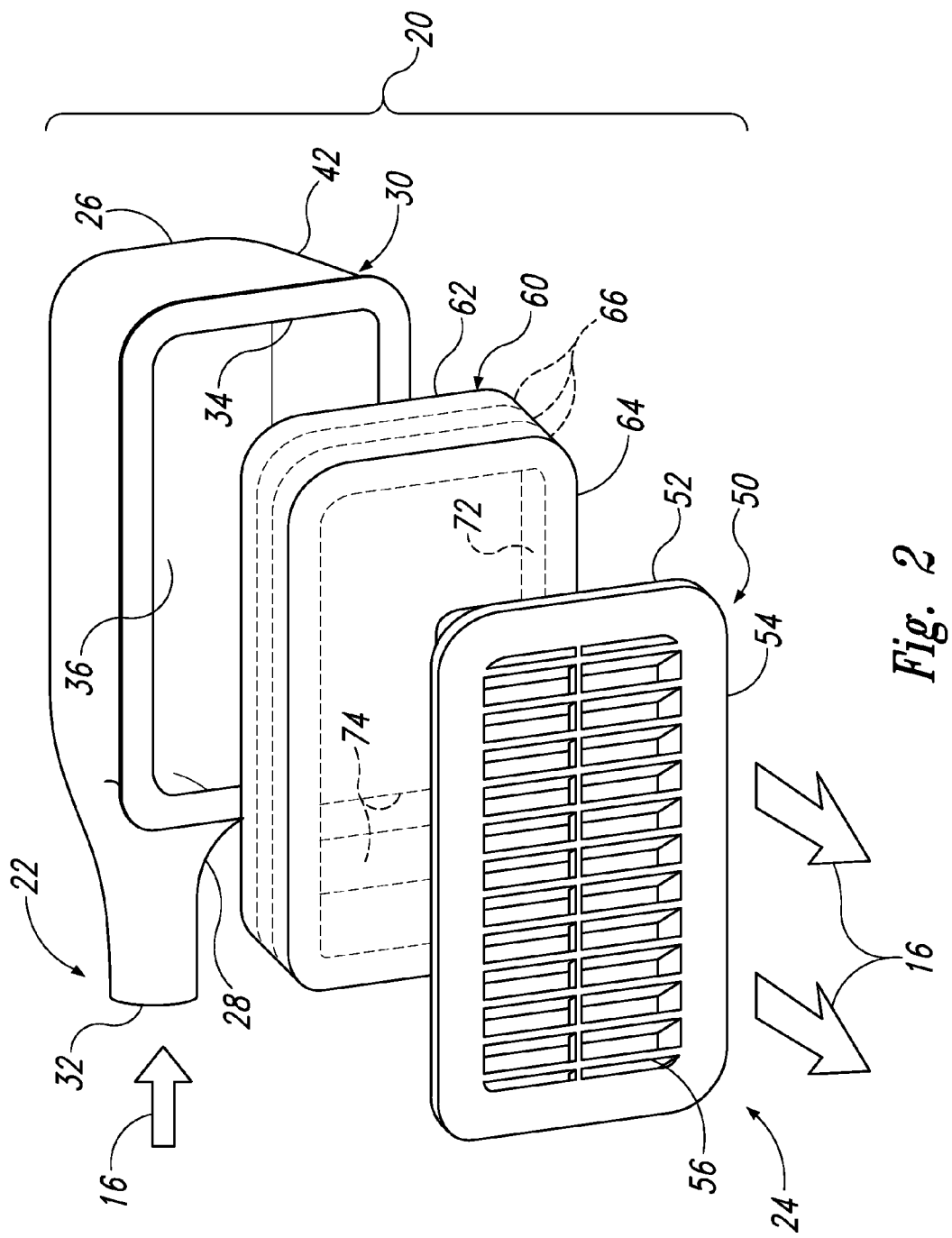
FIG. 2 is an exploded, perspective view of an example of an air diffuser assembly according to the present disclosure.

FIG. 2 is an exploded, perspective view of an example of an air diffuser assembly 20. Air diffuser assembly 20 includes a duct 30, a grille 50, and a flow conditioner 60. Air flow 16 is configured to enter at an upstream end 22 of the air diffuser assembly 20 through a duct inlet 32. The duct inlet 32 is the inlet to the air diffuser assembly 20 and the most upstream portion of the air diffuser assembly 20. Air diffuser assembly 20 is configured to direct the air flow 16 through duct 30, flow conditioner 60, and grille 50. The air flow 16 is configured to exit at a downstream end 24 of the air diffuser assembly 20 through the diffuser exit 54. The diffuser exit 54 is the outlet from the air diffuser assembly 20 and the most downstream portion of the air diffuser assembly 20.

Duct 30 has an inlet (duct inlet 32) and an outlet (a duct outlet 34). The duct outlet 34 is downstream of the duct inlet 32. Duct 30 also includes an outlet plenum 36 at least partially defined by the duct outlet 34. The outlet plenum 36 is a volume within the duct 30 that extends to the duct outlet 34. Duct 30 has an open interior, or a channel, to allow air to flow through the duct 30 from the duct inlet 32 to the duct outlet 34. The outlet plenum 36 is at least a portion of the downstream region of the open interior of the duct 30. The open interior of duct 30 may be defined by one or more duct walls 42. The outlet plenum 36 may be at least partially defined by at least a portion of the duct wall(s) 42. The duct wall(s) 42 may enclose the outlet plenum 36 except for an entrance toward the upstream end 22 and an exit toward the downstream end 24 (e.g., the duct outlet 34). Duct walls 42 may be relatively thin (e.g., relative to the interior dimensions or the overall size of the duct 30) and, hence, the duct 30 may be described as a tube, a shell, and/or an open box.

Duct 30 may be configured to redirect air from an incoming direction at the duct inlet 32 to an outgoing direction at the duct outlet 34. The central, or average, air flow through the duct 30 may bend, turn and/or curve as it traverses the duct 30. Thus, the duct 30 may be described as bent, turned, and/or curved, as shown in the example of FIG. 2. The bend (turn and/or curve) between the duct inlet 32 and the duct outlet 34 is described by an outward side 26 and an inward side 28. The duct 30 on the outward side 26 of the bend is generally concave to the air flow (the inside of the duct 30). The duct 30 on the inward side 28 of the bend is generally convex to the air flow (the inside of the duct 30). The duct 30 may be configured to produce slower air flow and/or more turbulent air along the inward side 28 than along the outward side 26. Additionally or alternatively, the duct 30 may be configured to have less direct sound path from the duct inlet 32 to the duct outlet 34 along the inward side 28 than along the outward side 26.

Grille 50 has an inlet (grille inlet 52) and an outlet (diffuser exit 54). The grille inlet 52 is upstream of the diffuser exit 54. When assembled, the grille 50 is coupled, directly and/or indirectly, to the duct outlet 34 with the grille inlet 52 facing the duct outlet 34 and the outlet plenum 36. Generally, the grille 50 is configured to span the entire duct outlet 34, i.e., the grille 50 generally covers the duct outlet 34. The grille 50, and specifically the diffuser exit 54, may be the visible surface of the air diffuser assembly 20 within the cabin 14. In some embodiments, the grille 50 may be within the outlet plenum 36. The grille 50 may be configured to retain the flow conditioner 60 within the duct 30. The grille 50 may be a body with a plurality of air channels 56 (e.g., holes, slits, and/or apertures) spanning the body from the grille inlet 52 to the diffuser exit 54. The grille 50 may include louvers, slats, vanes, and/or fins, e.g., to redirect air as it exits the diffuser exit 54. Without the flow conditioner 60, air flow through the grille 50 (at least at sufficiently high velocity) may vibrate and/or generate noise from the grille 50.

Air diffuser assembly 20 generally is configured to create diverging air flow from the duct inlet 32 to the diffuser exit 54. The diverging air flow spreads the incoming air flow into a relatively broad outgoing air flow. The duct inlet 32 may be relatively smaller, at least in one direction, than the diffuser exit 54. In such embodiments, the duct inlet 32 may be described as narrow and the diffuser exit 54 may be described as wide and/or broad. The open area (the total cross-sectional area that may allow a fluid to pass) defined by the duct inlet 32 may be less than the open area defined by the duct outlet 34 and/or the open area defined by the diffuser exit 54. The ratio of the open area of the diffuser exit 54 to the open area of the duct inlet 32 may be greater than 2, greater than 4, greater than 8, or greater than 12.

The interior profile, or shape, of duct 30 may change from the duct inlet 32 to the duct outlet 34. Thus, the duct inlet 32 may have a different profile shape than the duct outlet 34 and the grille 50. In the example of FIG. 2, the duct inlet 32 has a generally round profile while the duct outlet 34 and the grille 50 have generally oblong shapes. The interior profiles of the duct inlet 32 and the duct outlet 34, each independently, may be substantially round, substantially oval, substantially oblong, and/or substantially rectangular. Where the duct outlet 34 is larger than the duct inlet 32, the duct outlet 34 may be larger in one or more directions. For example, a rectangular duct outlet 34 may have a length and/or width that is larger than the diameter of a round duct inlet 32. Characteristic dimensions (e.g., diameter, effective diameter, length, and/or width) of the interior profile of the duct inlet 32 may be greater than 10 mm (millimeters), greater than 20 mm, greater than 50 mm, less than 500 mm, less than 200 mm, and/or less than 100 mm. Characteristic dimension of the interior profile of the duct outlet 34 may be greater than 10 mm, greater than 20 mm, greater than 50 mm, greater than 100 mm, less than 1,000 mm, less than 500 mm, less than 200 mm, and/or less than 100 mm. For non-circular profiles, the aspect ratio (the ratio of the major axis to the minor axis) may be about 1, at least 1.1, at least 1.5, at least 2, at most 25, and/or at most 10.

Flow conditioner 60 is configured to create a backpressure within the duct 30 and/or upstream of the flow conditioner 60, i.e., flow conditioner 60 is configured to create flow resistance. Flow conditioner 60 creates a pressure differential from a flow conditioner entrance 62 to a flow conditioner exit 64 when air is flowing through the flow conditioner 60. Flow conditioner 60 reduces the velocity of air flowing out of the flow conditioner 60 toward the diffuser exit 54 relative to the velocity of air flowing toward the diffuser exit in an air diffuser assembly without the flow conditioner 60 (i.e., unaffected by the flow conditioner 60). Flow conditioner 60 may be configured to create and/or maintain an air pressure differential (across the flow conditioner 60) of less than 20 kPa, less than 10 kPa, less than 5 kPa, less than 2 kPa, less than 1 kPa, greater than 0.5 kPa, greater than 1 kPa, and/or greater than 2 kPa when an air flow into the flow conditioner 60 is at a predefined velocity (such as 1 m/s, 2 m/s, or 5 m/s), volumetric flow rate (such as 240 L/min or 500 L/min), mass flow rate (such as 250 g/min or 500 g/min), and/or input pressure (such as 80 kPa, 90 kPa, or 100 kPa). Flow conditioner 60 may be configured to create and/or maintain an air velocity differential (across the flow conditioner 60) of greater than 0.5 m/s, greater than 1 m/s, less than 10 m/s, and/or less than 5 m/s when an air flow into the flow conditioner 60 is at a predefined volumetric flow rate (such as 240 L/min or 500 L/min), mass flow rate (such as 250 g/min or 500 g/min), and/or input pressure (such as 80 kPa, 90 kPa, or 100 kPa).

Flow conditioner 60 may be configured to diffuse the incoming air flow by spreading the incoming air flow into a broader outgoing air flow and/or by distributing the outgoing air flow more evenly than the incoming air flow. Flow conditioner 60 may be configured to establish an air flow profile (e.g., a velocity profile, a mass flow profile) at the flow conditioner exit 64, the grille inlet 52, and/or the diffuser exit 54 that is more uniform than the air flow profile at the duct inlet 32 and/or the flow conditioner entrance 62. The air flow profile emitted by the flow conditioner exit 64 may be essentially plug flow and/or turbulent.

Flow conditioner 60 is configured to reduce noise generated by air flow through the air diffuser assembly 20 relative to an air diffuser assembly without the flow conditioner 60 (i.e., unaffected by the flow conditioner 60). The flow conditioner 60 may attenuate noise generated upstream of the flow conditioner 60 (e.g., noise carried to the flow conditioner 60 by the incoming air stream) by, for example, diffusing the incoming air stream, distributing the velocity profile of the incoming air stream (via backpressure), providing indirect flow paths for sound transmission through the flow conditioner 60, and/or blocking the sound transmission through the flow conditioner 60. The flow conditioner 60 may reduce noise generated by air flow downstream of the flow conditioner 60 by, for example, spreading the outgoing air stream and/or relatively uniformly distributing the outgoing air stream across the flow conditioner exit 64. For example, the flow conditioner 60 may reduce noise generated by air flow through the grille 50 relative to noise generated by the air flow unaffected by the flow conditioner 60. The flow conditioner 60 may have acoustic properties selected to attenuate, dissipate, and/or reduce noise generated upstream and/or downstream, for example, low acoustic transmission, high acoustic absorption, and/or high acoustic reflection.

Flow conditioner 60 is porous, i.e., it is configured to admit the flow of air through a plurality of pores, open cells, interconnected voids, and/or interstices, and provides a plurality of convoluted and/or torturous air paths through the flow conditioner 60. The air paths through the pores, open cells, interconnected voids, and/or interstices are generally narrow and/or constricted. Thus, the flow conditioner 60 may provide flow resistance, air diffusion, and/or sound isolation. Flow conditioner 60 is not configured to filter small particulate from the air flow at a substantial level. Additionally or alternatively, flow conditioner 60 may be configured operate with filtered air (i.e., the air is filtered of small particulates). The pores, open cells, interconnected voids, and/or interstices may have an average effective diameter (as measured in cross section relative to the air flow) of at least 30 μm (micrometers), at least 100 μm, at least 300 μm, at least 1,000 μm, at most 3,000 μm, at most 1,000 μm, and/or at most 300 μm. Flow conditioner 60 may be configured to transmit, convey, and/or pass greater than 90%, greater than 95%, and/or greater than 99% of small particulates through the flow conditioner 60. Small particulates are airborne particles with an effective diameter of less than 300 μm, less than 100 μm, less than 30 μm, and/or less than 10 μm. Filtered air may be filtered of greater than 90%, greater than 95%, and/or greater than 99% of small particulates as compared to unfiltered air (prior to filtering).

Flow conditioner 60 may include, and/or may be, an open-cell foam, a reticulated foam, and/or a felt material. An open-cell foam may have greater than 10%, greater than 50%, or greater than 70% of the cells open (connected to the exterior of the foam material to permit fluid flow through the foam). A reticulated foam is a foam consisting primarily of the edges, or struts, between cells, with few, if any, closed cells, and few to no cell faces, or walls. Felt is a nonwoven fabric of fibers matted together by condensing and/or pressing. Felt may be needled (a type of condensing) and/or may include stitching. Additionally or alternatively, flow conditioner 60 may include one or more panels of porous and/or open material, e.g., screen panels, mesh panels, textile panels, and/or fabric panels.

Flow conditioner 60 may be essentially free of volatile substances and/or particulates that may circulate with the air flow, e.g., to avoid contaminating the air flow. Flow conditioner 60 may be essentially fire resistant and/or resist formation of smoke, vapors, and/or particulates, e.g., to reduce the formation and/or spread of fire within the air diffuser assembly 20. Flow conditioner 60 may be moisture resistant, quick drying, anhygroscopic, and/or hydrophobic, e.g., to resist moisture build up and/or potential microbial growth within the air diffuser assembly 20. Flow conditioner 60 may include plastic, polymers, fibers, ceramic, glass, and/or metal. For example, flow conditioner 60 may include aramid fibers, e.g., products sold under the trade names NOMEX, KEVLAR, TWARON, and TECHNORA, and/or melamine foam, e.g., a formaldehyde-melamine-sodium bisulfite copolymer sold under the trade name BASOTECT.

Flow conditioner 60 may include a plurality of layers 66 of materials. Each layer 66 is porous and/or includes apertures to permit the flow of air. The layers 66 may be different materials or all the same material. Layers 66 are arranged in a stack along the upstream-downstream direction (the average direction of air flow through the duct 30 and the air diffuser assembly 20), i.e., the layers 66 extend generally across the cross section of the duct 30 and transverse to the air flow through the duct 30 and the air diffuser assembly 20.

Layers 66 may be coupled together, for example by bonding, fusing, and/or fastening, in a stack. Layers 66 may be essentially permanently coupled together (e.g., fused, bonded) and/or one or more layers 66 may be separable from one or more other layers 66. Where the layers 66 are coupled together, the flow conditioner 60 may be more convenient to handle and to insert into the duct 30. Each layer 66 independently may be an open-cell foam, a reticulated foam, a felt material, and/or a panel (e.g., a screen panel, a mesh panel, a textile panel, and/or a fabric panel). Generally, the most downstream layer 66 is an open-cell foam, a reticulate foam, and/or a felt material.

Layers 66 may be configured to provide sufficient structural integrity to the flow conditioner 60 such that it may withstand use in the air diffuser assembly 20. For example, foams and/or felts may be layered with porous panels to stiffen the flow conditioner 60, generally with at least one of the foam and/or felt layers 66 downstream of the porous panel layer(s) 66. As another example, oriented materials such as mesh, textiles, and fabrics may be layered in different orientations to strengthen the flow conditioner 60. In one particular embodiment, flow conditioner 60 may include two layers 66: a first layer 66 of a panel on the upstream side of the flow conditioner 60 and a second layer 66 of foam and/or felt coupled to the first layer 66 (and thus on the downstream side of the first layer 66). In another particular embodiment, flow conditioner 60 may include three layers 66: a central layer 66 of a panel sandwiched between a first layer 66 and a second layer 66, where the first layer 66 and the second layer 66 are each independently a foam and/or a felt.

In the air diffuser assembly 20, the flow conditioner 60 is positioned at least partially within the outlet plenum 36, with the flow conditioner entrance 62 facing the upstream air flow direction and the flow conditioner exit 64 facing the downstream air flow direction. The flow conditioner 60 may span substantially all of the open (cross-sectional) area of the duct 30 and/or the outlet plenum 36. Additionally or alternatively, the flow conditioner 60 may extend along a significant fraction of the duct wall(s) 42, sufficient to be coupled to the duct 30. The flow conditioner 60 may be coupled, directly and/or indirectly, to the duct 30, e.g., within the outlet plenum 36 and/or to one or more duct walls 42. The flow conditioner 60 may be friction fit within the duct 30, e.g., within the outlet plenum 36 and/or to one or more duct walls 42. The flow conditioner 60 may be releasably coupled to the duct 30, e.g., by friction fit, to facilitate removal, replacement, and/or maintenance of the air diffuser assembly 20 and/or the flow conditioner 60.

Flow conditioner 60 is proximate the grille 50. In some embodiments (e.g., where the flow conditioner exit 64 faces the grille inlet 52), the flow conditioner 60 is within the outlet plenum 36 and at least partially covered by the grille 50. In such case, the flow conditioner 60 is not the primary component visible from the cabin 14 (the grille 50 is). In other embodiments (e.g., where the flow conditioner entrance 62 faces the diffuser exit 54), the flow conditioner 60 at least partially covers the grille 50, which is within the outlet plenum 36. In such case, the flow conditioner 60 may be the primary component visible from the cabin 14. The flow conditioner 60 may be coupled, directly and/or indirectly, to the grille 50. The grille inlet 52 and/or the diffuser exit 54 may contact the flow conditioner 60. Space between the flow conditioner exit 64 and the grille 50 (the grille inlet 52 or the diffuser exit 54) may be less than 100 mm, less than 50 mm, less than 20 mm, less than 10 mm, greater than 1 mm, greater than 10 mm, greater than 20 mm, and/or greater than 50 mm.

Flow conditioner 60 and/or any of the layers 66 may be thick relative to the cross-sectional area of the flow conditioner entrance 62 and/or the cross-sectional area of the flow conditioner exit 64. For example, the flow conditioner 60 may have a thickness that is greater than 10 mm, greater than 20 mm, greater than 40 mm, less than 500 mm, less than 200 mm, and/or less than 100 mm. Layers 66 may be thick or thin. Each layer 66 independently may have a thickness that is greater than 0.5 mm, greater than 2 mm, greater than 10 mm, greater than 20 mm, greater than 40 mm, less than 500 mm, less than 200 mm, less than 100 mm, less than 50 mm, and/or less than 10 mm.

Figure 3:
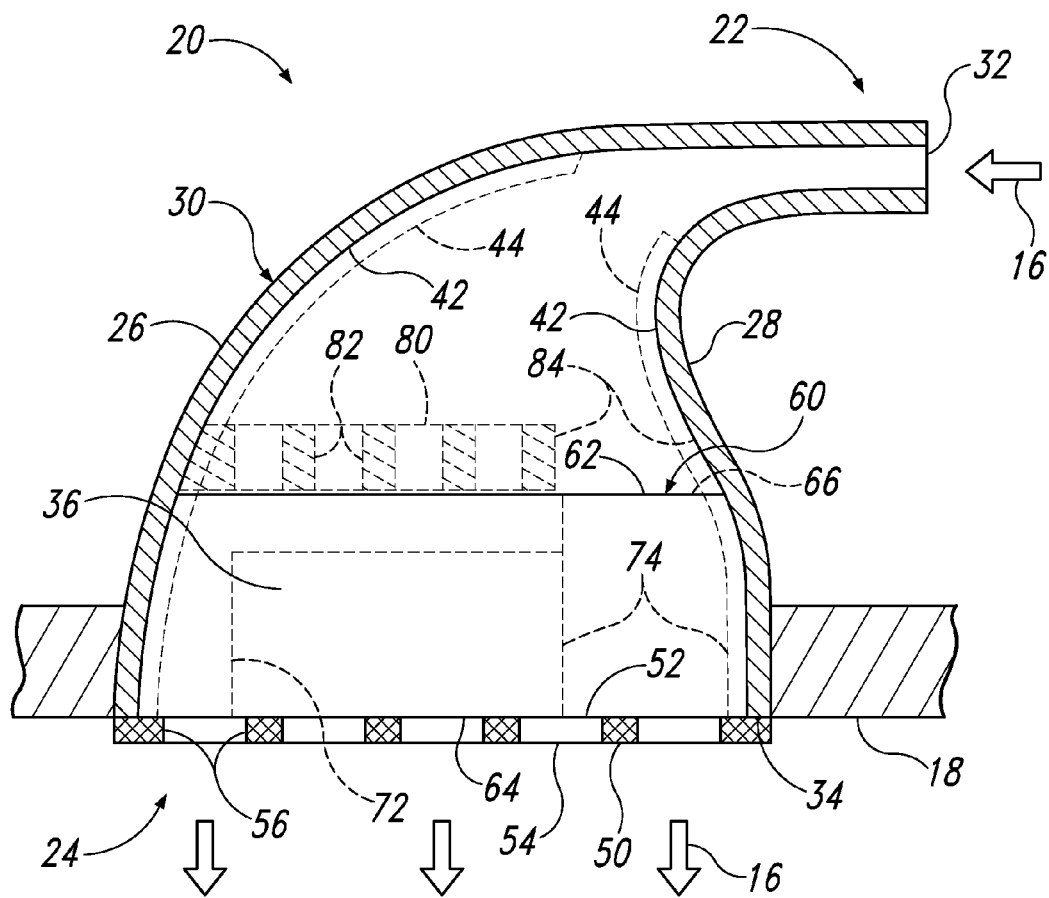
FIG. 3 is a schematic cross-section of an example of an air diffuser assembly according to the present disclosure as installed in an aircraft interior.

As shown in the perspective of FIG. 2 and the cross section of FIG. 3, flow conditioner 60 may define an optional cavity 72 that is open to the flow conditioner exit 64 or the flow conditioner entrance 62. In FIGS. 2 and 3, the cavity 72 is illustrated as open to the flow conditioner exit 64. The cavity 72 does not penetrate completely through the thickness of the flow conditioner 60. The material of the flow conditioner 60 may be thinner in the region of the cavity 72. The cavity 72 generally extends perpendicular to the thickness of the flow conditioner 60 a substantial fraction of the area of the flow conditioner exit 64 and/or flow conditioner entrance 62. The cavity 72 may extend to one or more of the duct walls 42 (or portions of the duct wall(s) 42). The cavity 72 may be separated from one or more of the duct walls 42 (or portions of the duct wall(s) 42) by material of the flow conditioner 60. For example, in FIG. 2, the optional cavity 72 is shown separated from the duct walls 42 by a section of material of the flow conditioner 60. The cavity may span at least 20%, at least 50%, at least 70%, at least 90%, substantially all, at most 90%, at most 70%, and/or at most 50% of the cross sectional area of the flow conditioner 60.

As also shown in the perspective of FIG. 2 and the cross section of FIG. 3, flow conditioner 60 may at least partially define one or more optional flow conditioner-duct open channel 74. Flow conditioner-duct open channel 74 is an open channel within the duct 30 that is configured for air to bypass the flow conditioner 60. Such air bypass may be useful to maintain a minimum air flow, e.g., in the event that particulates clog the flow conditioner 60 and/or in the event of smoke in the aircraft cabin and/or the environmental control system. Flow conditioner-duct open channel 74 has few to no obstructions and, thus, may provide substantially unrestricted flow through the flow conditioner-duct open channel 74. Where the duct 30 redirects air flow from the duct inlet 32 to the duct outlet 34, the flow conditioner-duct open channel 74 typically is positioned on the inward side 28 of the bend in the air flow path (as shown in both FIGS. 2 and 3). Air flow along the inward side 28 typically is slower and may have no direct sound path from the duct inlet 32 to the duct outlet 34. Hence, the inward side 28 may be a less critical position for the flow conditioner-duct open channel 74, at least with respect to distributing air flow and/or reducing sound transmission.

Flow conditioner-duct open channel 74 may be defined by the flow conditioner 60 and a portion of the duct wall(s) 42. Additionally or alternatively, flow conditioner-duct open channel 74 may be spaced apart from all of the duct walls 42.

The flow conditioner 60 may substantially span the open (cross-sectional) area of the outlet plenum 36, for example spanning at least 50%, at least 70%, at least 80%, at least 90%, at least 95%, at most 95%, at most 90%, at most 80%, at most 70%, and/or at most 50% of the open area of the outlet plenum 36. The area not spanned by the flow conditioner 60 may form the flow conditioner-duct open channel 74.

FIG. 3 shows an example of an air diffuser assembly 20 as installed in an aircraft interior, through a cabin wall 18. Though an example, the air diffuser assembly 20 of FIG. 3, includes features similar to those shown in the example of FIG. 2, and highlights the internal structure by showing a cross-sectional view.

As shown in FIG. 3, all or a portion of duct walls 42 may be covered by an optional wall covering 44. Wall covering 44 may be configured and/or positioned to reduce noise generated by air flow through the air diffuser assembly 20. Wall covering 44 may include, and/or may be, a porous material, an open-cell foam, a reticulated foam, and/or a felt material. Additionally or alternatively, wall covering 44 may include, and/or may be, a material and/or structure that attenuates, reflects, and/or redirects sound, at least at particular frequencies. Wall covering 44 may be essentially free of volatile substances and/or particulates that may circulate with the air flow, e.g., to avoid contaminating the air flow. Wall covering 44 may be essentially fire resistant and/or resist formation of smoke, vapors, and/or particulates, e.g., to reduce the formation and/or spread of fire within the air diffuser assembly 20. Wall covering 44 may be moisture resistant, quick drying, anhygroscopic, and/or hydrophobic, e.g., to resist moisture build up and/or potential microbial growth within the air diffuser assembly 20. Examples of materials for wall covering 44 include aramid fibers, e.g., products sold under the trade names NOMEX, KEVLAR, TWARON, and TECHNORA, and melamine foam, e.g., a formaldehyde-melamine-sodium bisulfite copolymer sold under the trade name BASOTECT. Wall covering 44 may be coupled to one or more duct walls 42 and may be composed of a continuous section of material and/or a patchwork of material sections. Wall covering 44 may cover at least 10%, at least 30%, at least 50%, at least 70%, at least 90%, substantially all, at most 90%, at most 70%, at most 50%, at most 30%, and/or at most 10% of the duct wall(s) 42 and/or the duct wall(s) within the outlet plenum 36. Where wall covering 44 is present, flow conditioner 60 may be coupled, directly and/or indirectly, to the wall covering 44, for example by friction fit against the wall covering 44.

Duct 30 may include an optional baffle plate 80 upstream of the outlet plenum 36. Generally, baffle plate 80, when present, partially defines the outlet plenum 36 by forming at least a portion of the upstream end of the outlet plenum 36. Baffle plate 80 is coupled to the duct 30, e.g., the duct wall(s) 42, and may be integral with the duct 30 and/the duct wall(s) 42. Baffle plate 80 may be oriented in a position generally across the air flow through the duct 30. For example, baffle plate 80 may be positioned substantially parallel to the grille 50. The baffle plate 80 may contact and/or be coupled, directly and/or indirectly, to the flow conditioner 60.

Baffle plate 80 is configured to transmit air through the baffle plate 80. Baffle plate 80 may be perforated and/or define a plurality of channels 82 through the baffle plate 80. The perforations and/or channels 82 are substantially larger than the pores etc. of the flow conditioner 60. The perforations and/or channels 82 may have an average effective diameter of at least 1 mm, at least 3 mm, or at least 10 mm. Baffle plate 80 may have a total open area (total area open to air flow, e.g., the sum of all the areas of the perforations and/or channels 82) that is at least 30%, at least 50%, at least 70%, at least 90%, at most 99%, at most 90%, and/or at most 70% of a total area (the solid area plus the open area) of the baffle plate 80.

Baffle plate 80 may define one or more optional baffle plate-duct open channels 84. Baffle plate-duct open channel 84 is an open channel within the duct 30 that is configured for air to bypass the baffle plate 80. Such air bypass may be useful to maintain a minimum air flow, e.g., in the event that large particulates clog the baffle plate 80 and/or in the event of smoke in the aircraft cabin and/or the environmental control system. Baffle plate-duct open channel 84 has few to no obstructions and, thus, may provide substantially unrestricted flow through the baffle plate-duct open channel 84. Where the duct 30 redirects air flow from the duct inlet 32 to the duct outlet 34, the baffle plate-duct open channel 84 typically is positioned on the inward side 28 of the bend in the air flow path (as shown in both FIGS. 2 and 3). Air flow along the inward side 28 typically is slower and may have no direct sound path from the duct inlet 32 to the duct outlet 34. Hence, the inward side 28 may be a less critical position for the baffle plate-duct open channel 84, at least with respect to distributing air flow and/or reducing sound transmission. Generally the baffle plate-duct open channel 84 is partially, substantially, or completely aligned with the flow conditioner-duct open channel 74, when both channels are present.

Baffle plate-duct open channel 84 may be defined by the baffle plate 80 and a portion of the duct wall(s) 42. Additionally or alternatively, baffle plate-duct open channel 84 may be spaced apart from all of the duct walls 42. The baffle plate 80 may substantially span the open (cross-sectional) area of the duct 30 proximate the baffle plate 80, e.g., the inlet area of the outlet plenum 36, for example spanning at least 50%, at least 70%, at least 80%, at least 90%, at least 95%, at most 95%, at most 90%, at most 80%, at most 70%, and/or at most 50% of the open area of the duct 30 proximate the baffle plate 80. The area not spanned by the baffle plate 80 may form the baffle plate-duct open channel 84. The baffle plate 80 may, but is not required to, span substantially all of the open area of the duct 30 proximate the baffle plate 80 if the baffle plate-duct open channel 84 is not present.

Figure 4:
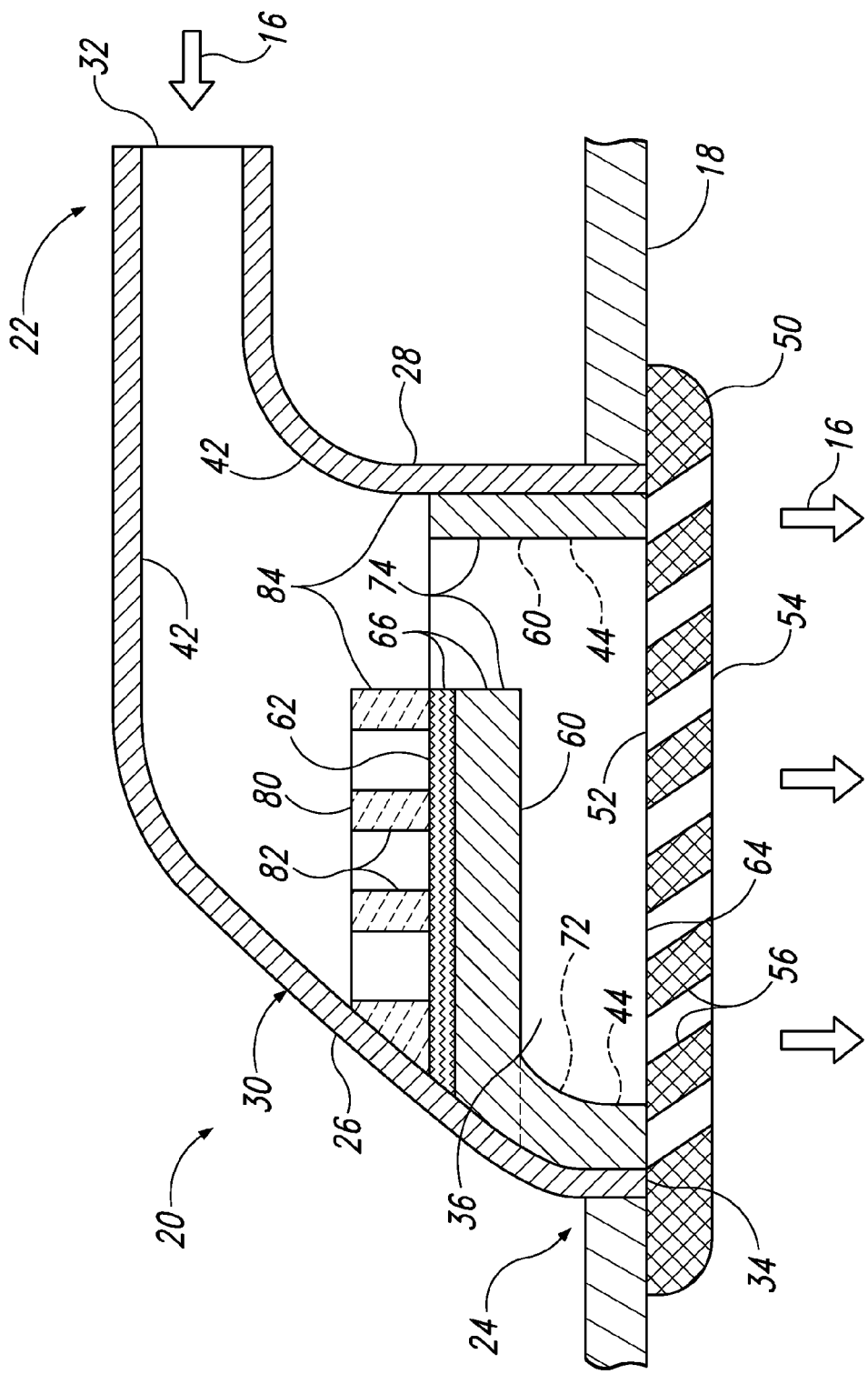
FIG. 4 is a schematic cross-section of another example of an air diffuser assembly according to the present disclosure as installed in an aircraft interior.

FIG. 4 shows another example of an air diffuser assembly 20 as installed in an aircraft interior, through a cabin wall 18. In the example of FIG. 4, the flow conditioner 60 defines cavity 72 on the downstream side of the flow conditioner 60 and connected to the flow conditioner exit 64. The flow conditioner 60 also defines flow conditioner-duct open channel 74 through the flow conditioner 60. The cavity 72 and the flow conditioner-duct open channel 74 are spaced away from the duct walls 42 in the outlet plenum 36. Alternatively, the flow conditioner 60 may not define any cavity 72 and the duct walls 42 downstream of the flow conditioner 60 may be at least partially covered by wall covering 44.

The duct 30 includes baffle plate 80 with plurality of channels 82 configured to transmit air. The baffle plate 80 partially defines the upstream end of the outlet plenum 36 and contacts the flow conditioner entrance 62. The baffle plate 80 and the neighboring duct wall 42 define the baffle plate-duct open channel 84. The baffle plate-duct open channel 84 is substantially aligned with the flow conditioner-duct open channel 74.

The flow conditioner 60 is composed of essentially two layers 66. The first layer 66 (the upstream layer 66) is relatively thin and may be coupled to the baffle plate 80. For example, the first layer may be a panel (e.g., a screen panel, a mesh panel, a textile panel, and/or a fabric panel). The second layer 66 (the downstream layer 66) is relatively thick and may be coupled to the first layer 66 and/or the grille 50. The first layer 66 may be essentially permanently coupled (e.g., fused, bonded) to the baffle plate 80 and/or the second layer 66. The second layer 66 may be essentially permanently coupled to the first layer 66 and/or the grille 50. The first layer 66 and the second layer 66 may be separable from each other, from the baffle plate 80, and/or from the grille 50. Where the layers 66 are coupled together and/or coupled to the grille 50, the flow conditioner 60 may be conveniently inserted as a whole into the outlet plenum 36. The flow conditioner 60 may be substantially form fit to the outlet plenum 36 and be retained in the outlet plenum 36 by a friction fit and/or by the grille 50.

Examples of inventive subject matter according to the present disclosure are described in the following enumerated paragraphs.

A1. A quiet cabin air diffuser assembly comprising:
a duct having a duct inlet, a duct outlet downstream of the duct inlet, and an outlet plenum at least partially defined by the duct outlet;
a grille having a diffuser exit and a grille inlet upstream of the diffuser exit, wherein the grille is coupled to the duct outlet with the grille inlet facing the duct outlet and the outlet plenum; and
a porous flow conditioner positioned at least partially within the outlet plenum, wherein the porous flow conditioner is configured to create backpressure in the duct and to reduce a velocity of air flowing out of the porous flow conditioner toward the diffuser exit relative to a velocity of air flow unaffected by the porous flow conditioner.

A2. The quiet cabin air diffuser assembly of paragraph A1, wherein the porous flow conditioner is configured to create an air pressure differential of less than 20 kPa, less than 10 kPa, less than 5 kPa, less than 2 kPa, less than 1 kPa, greater than 0.5 kPa, greater than 1 kPa, and/or greater than 2 kPa when a velocity of air flowing into the duct is 2 m/s.

A3. The quiet cabin air diffuser assembly of any of paragraphs A1-A2, wherein the porous flow conditioner is configured to create an air pressure differential of less than 20 kPa, less than 10 kPa, less than 5 kPa, less than 2 kPa, less than 1 kPa, greater than 0.5 kPa, greater than 1 kPa, and/or greater than 2 kPa when an air flow from the duct is 240 L/min.

A4. The quiet cabin air diffuser assembly of any of paragraphs A1-A3, wherein the quiet cabin air diffuser assembly is configured to flow air greater than 200 g/min, greater than 500 g/min, less than 1,500 g/min, less than 1,000 g/min, greater than 200 L/min, greater than 500 L/min, less than 2,000 L/min, and/or less than 1,500 L/min.

A5. The quiet cabin air diffuser assembly of any of paragraphs A1-A4, wherein the quiet cabin air diffuser assembly is configured to admit air flow through the duct inlet at a velocity of greater than 1 m/s, greater than 2 m/s, less than 10 m/s, and/or less than 5 m/s.

A6. The quiet cabin air diffuser assembly of any of paragraphs A1-A5, wherein the quiet cabin air diffuser assembly is configured to emit air flow from the diffuser exit at a velocity of greater than 1 m/s, greater than 2 m/s, less than 10 m/s, and/or less than 5 m/s.

A7. The quiet cabin air diffuser assembly of any of paragraphs A1-A6, wherein the quiet cabin air diffuser assembly is configured to admit air at an input air pressure of greater than 60 kPa, greater than 70 kPa, greater than 80 kPa, greater than 90 kPa, greater than 100 kPa, less than 150 kPa, less than 120 kPa, less than 100 kPa, and/or less than 90 kPa.

A8. The quiet cabin air diffuser assembly of any of paragraphs A1-A7, wherein the quiet cabin air diffuser assembly is configured to emit air at an output air pressure of greater than 60 kPa, greater than 70 kPa, greater than 80 kPa, greater than 90 kPa, greater than 100 kPa, less than 120 kPa, less than 100 kPa, less than 90 kPa, and/or less than 80 kPa.

A9. The quiet cabin air diffuser assembly of any of paragraphs A1-A8, wherein the porous flow conditioner is configured to reduce noise generated by air flow through the quiet cabin air diffuser assembly relative to noise generated by air flow unaffected by the porous flow conditioner.

A10. The quiet cabin air diffuser assembly of any of paragraphs A1-A9, wherein the porous flow conditioner is configured to attenuate noise generated upstream of the porous flow conditioner.

A11. The quiet cabin air diffuser assembly of any of paragraphs A1-A10, wherein the porous flow conditioner is configured to reduce noise generated by air flow downstream of the porous flow conditioner.

A12. The quiet cabin air diffuser assembly of any of paragraphs A1-A11, wherein the porous flow conditioner is configured to reduce noise generated by air flow through the grille relative to noise generated by air flow unaffected by the porous flow conditioner.

A13. The quiet cabin air diffuser assembly of any of paragraphs A1-A12, wherein the quiet cabin air diffuser assembly is configured to generate a sound level that is less than 20 dBA, less than 10 dBA, less than 5 dBA, less than 3 dBA, less than 2 dBA, or less than 1 dBA more than ambient aircraft cabin noise when air flows from the duct inlet to the diffuser exit, and optionally wherein the sound level includes the sound level at frequencies of 0.1 kHz, 0.2 kHz, 0.5 Hz, 1 kHz, 2 kHz, 3 kHz, 4 kHz, 5 kHz, 8 kHz, 10 kHz, 12 kHz, 15 kHz, 20 kHz, 0.1-10 kHz, 0.5-4 kHz, 1-4 kHz, 2-4 kHz, 3-10 kHz, 5-10 kHz, greater than 5 kHz, and/or greater than 8 kHz.

A14. The quiet cabin air diffuser assembly of any of paragraphs A1-A13, wherein the quiet cabin air diffuser assembly is configured to generate a speech interference level of less than 55 dBA, less than 52 dBA, less than 50 dBA, less than 48 dBA, less than 46 dBA, or less than 44 dBA when air flows from the duct inlet through the diffuser exit.

A15. The quiet cabin air diffuser assembly of any of paragraphs A1-A14, wherein an open area of the duct inlet is less than an open area of the diffuser exit.

A15.1. The quiet cabin air diffuser assembly of paragraph A15, wherein a ratio of the open area of the diffuser exit to the open area of the duct inlet is greater than 2, greater than 4, greater than 8, or greater than 12.

A16. The quiet cabin air diffuser assembly of any of paragraphs A1-A15.1, wherein the porous flow conditioner has an entrance and an exit downstream of the entrance.

A16.1. The quiet cabin air diffuser assembly of paragraph A16, wherein the porous flow conditioner is configured to establish an air flow profile at the grille inlet that is more uniform than an air flow profile at the entrance of the porous flow conditioner.

A16.2. The quiet cabin air diffuser assembly of any of paragraphs A16-A16.1, wherein the porous flow conditioner defines a cavity that is open to one of the exit of the porous flow conditioner and the entrance of the porous flow conditioner.

A17. The quiet cabin air diffuser assembly of any of paragraphs A1-A16.2, wherein the porous flow conditioner includes at least one of an open-cell foam, a reticulated foam, and a felt material.

A18. The quiet cabin air diffuser assembly of any of paragraphs A1-A17, wherein the porous flow conditioner includes at least one of a screen panel, a mesh panel, a textile panel, and a fabric panel.

A19. The quiet cabin air diffuser assembly of any of paragraphs A1-A18, wherein the porous flow conditioner includes a plurality of layers and wherein the layers are stacked in a direction of average air flow through the duct and/or the quiet cabin air diffuser assembly.

A19.1. The quiet cabin air diffuser assembly of paragraph A19, wherein a first layer of the plurality of layers is at least one of a screen panel, a mesh panel, a textile panel, and a fabric panel, and optionally wherein the first layer is upstream of an exit of the flow conditioner.

A19.2. The quiet cabin air diffuser assembly of any of paragraphs A19-A19.1, wherein a second layer of the plurality of layers is at least one of a porous material, an open-cell foam, a reticulated foam, and a felt material, and optionally wherein the second layer is a downstream layer of the flow conditioner that at least partially defines an exit of the flow conditioner.

A19.3. The quiet cabin air diffuser assembly of paragraph A19, wherein a first layer of the plurality of layers is at least one of a screen panel, a mesh panel, a textile panel, and a fabric panel, wherein a second layer of the plurality of layers is at least one of a porous material, an open-cell foam, a reticulated foam, and a felt material, and optionally wherein the second layer is downstream of the first layer.

A19.4. The quiet cabin air diffuser assembly of paragraph A19, wherein the porous flow conditioner includes a central layer sandwiched between a first layer and a second layer, wherein the central layer is at least one of a screen panel, a mesh panel, a textile panel, and a fabric panel, and wherein the first layer and the second layer are each independently selected from the group consisting of a porous material, an open-cell foam, a reticulated foam, and a felt material.

A20. The quiet cabin air diffuser assembly of any of paragraphs A1-A19.4, wherein the porous flow conditioner substantially spans an open area of the outlet plenum and optionally wherein the porous flow conditioner spans at least 50%, at least 70%, at least 90%, at least 95%, substantially all, at most 95%, at most 90%, and/or at most 70% of the open area of the outlet plenum.

A21. The quiet cabin air diffuser assembly of any of paragraphs A1-A20, wherein the porous flow conditioner at least partially defines a flow conditioner-duct open channel in the duct.

A21.1. The quiet cabin air diffuser assembly of paragraph A21, wherein the flow conditioner-duct open channel has an area that is at least 5%, at least 10%, at least 20%, at least 30%, at least 50%, at most 50%, at most 30%, at most 20%, and/or at most 10% of an open area of the duct proximate the porous flow conditioner.

A21.2. The quiet cabin air diffuser assembly of any of paragraphs A21-A21.1, wherein the flow conditioner-duct open channel is configured for unrestricted flow of air therethrough.

A21.3. The quiet cabin air diffuser assembly of any of paragraphs A21-A21.2, wherein the flow conditioner-duct open channel is positioned along an inward side of a bend in the duct.

A22. The quiet cabin air diffuser assembly of any of paragraphs A1-A21.3, wherein the porous flow conditioner defines pores through the porous flow conditioner and optionally wherein an average effective diameter of the pores is at least 30 µm, at least 100 µm, at least 300 µm, at least 1,000 µm, at most 3,000 µm, at most 1,000 µm, and/or at most 300 µm.

A23. The quiet cabin air diffuser assembly of any of paragraphs A1-A22, wherein the porous flow conditioner is configured to transmit greater than 95% of airborne particles with an effective diameter of less than 300 µm, less than 100 µm, less than 30 µm, or less than 10 µm.

A24. The quiet cabin air diffuser assembly of any of paragraphs A1-A23, wherein the duct includes a baffle plate upstream of the outlet plenum.

A24.1. The quiet cabin air diffuser assembly of paragraph A24, wherein the baffle plate defines a plurality of channels through the baffle plate and optionally wherein an average effective diameter of the channels is at least 1 mm, at least 3 mm, or at least 10 mm.

A24.2. The quiet cabin air diffuser assembly of any of paragraphs A24-A24.1, wherein the baffle plate is perforated.

A24.3. The quiet cabin air diffuser assembly of any of paragraphs A24-A24.2, wherein the baffle plate partially defines the outlet plenum.

A24.4. The quiet cabin air diffuser assembly of any of paragraphs A24-A24.3, wherein the porous flow conditioner contacts the baffle plate.

A24.5. The quiet cabin air diffuser assembly of any of paragraphs A24-A24.4, wherein the porous flow conditioner is coupled to the baffle plate.

A24.6. The quiet cabin air diffuser assembly of any of paragraphs A24-A24.5, wherein the baffle plate substantially spans an open area of the duct proximate the baffle plate and optionally wherein the baffle plate spans at least 50%, at least 70%, at least 90%, at least 95%, substantially all, at most 95%, at most 90%, at most 70%, and/or at most 50% of the open area of the duct proximate the baffle plate.

A24.7. The quiet cabin air diffuser assembly of any of paragraphs A24-A24.6, wherein the baffle plate has a total open area that is at least 30%, at least 50%, at least 70%, at least 90%, at most 99%, at most 90%, and/or at most 70% of a total area of the baffle plate.

A24.8. The quiet cabin air diffuser assembly of any of paragraphs A24-A24.7, wherein the baffle plate at least partially defines a baffle plate-duct open channel in the duct.

A24.8.1. The quiet cabin air diffuser assembly of paragraph A24.8, wherein the baffle plate-duct open channel has an area that is at least 5%, at least 10%, at least 20%, at least 30%, at least 50%, at most 50%, at most 30%, at most 20%, and/or at most 10% of an open area of the duct proximate the baffle plate.

A24.8.2. The quiet cabin air diffuser assembly of any of paragraphs A24.8-A24.8.1, wherein the baffle plate-duct open channel is configured for unrestricted flow of air therethrough.

A24.8.3. The quiet cabin air diffuser assembly of any of paragraphs A24.8-A24.8.2, wherein the baffle plate-duct open channel is positioned along an inward side of a bend in the duct.

A25. The quiet cabin air diffuser assembly of any of paragraphs A1-A24.8.3, wherein the grille is coupled, optionally directly coupled, to the porous flow conditioner.

A26. The quiet cabin air diffuser assembly of any of paragraphs A1-A25, wherein the grille inlet contacts the porous flow conditioner.

A27. The quiet cabin air diffuser assembly of any of paragraphs A1-A26, wherein the grille retains the porous flow conditioner within the duct.

A28. The quiet cabin air diffuser assembly of any of paragraphs A1-A27, wherein the porous flow conditioner is coupled, optionally directly coupled, to the duct, optionally within the outlet plenum.

A29. The quiet cabin air diffuser assembly of any of paragraphs A1-A28, wherein the porous flow conditioner is friction fit within the duct and optionally within the outlet plenum.

A30. The quiet cabin air diffuser assembly of any of paragraphs A1-A29, wherein the duct includes a duct wall that at least partially defines the outlet plenum.

A30.1. The quiet cabin air diffuser assembly of paragraph A30, wherein the duct wall includes a wall covering that is at least one of a porous material, an open-cell foam, a reticulated foam, and a felt material.

A30.1.1. The quiet cabin air diffuser assembly of paragraph A30.1, wherein the wall covering covers at least 10%, at least 30%, at least 50%, at least 70%, at least 90%, substantially all, at most 90%, at most 70%, at most 50%, at most 30%, and/or at most 10% of the duct wall and/or the duct wall within the outlet plenum.

A30.1.2. The quiet cabin air diffuser assembly of any of paragraphs A30.1-A30.1.1, wherein the porous flow conditioner is friction fit against the wall covering.

A30.2. The quiet cabin air diffuser assembly of any of paragraphs A30-A30.1.2, wherein the porous flow conditioner is friction fit against the duct wall.

A30.3. The quiet cabin air diffuser assembly of any of paragraphs A30-A30.2, wherein the duct wall encloses the outlet plenum except for an entrance and an exit that is downstream of the entrance.

A31. An aircraft environmental control system including the quiet cabin air diffuser assembly of any of paragraphs A1-A30.3, wherein the aircraft environmental control system is configured to supply air to an aircraft cabin through the quiet cabin air diffuser assembly.

B1. A method of supplying air to an aircraft cabin, comprising:
supplying air through the quiet cabin air diffuser assembly of any of paragraphs A1-A30.3.

B2. The method of paragraph B1, wherein the supplying includes supplying while the aircraft is in flight.

B3. The method of any of paragraphs B1-B2, wherein the supplying includes flowing air through the quiet cabin air diffuser assembly at greater than 200 g/min, greater than 500 g/min, less than 1,500 g/min, less than 1,000 g/min, greater than 200 L/min, greater than 500 L/min, less than 2,000 L/min, and/or less than 1,500 L/min.

B4. The method of any of paragraphs B1-B3, wherein the supplying includes flowing air into the duct inlet at a velocity of greater than 1 m/s, greater than 2 m/s, less than 10 m/s, and/or less than 5 m/s.

B5. The method of any of paragraphs B1-B4, wherein the supplying includes flowing air out of the diffuser exit at a velocity of greater than 1 m/s, greater than 2 m/s, less than 10 m/s, and/or less than 5 m/s.

B6. The method of any of paragraphs B1-B5, wherein the supplying includes supplying with a sound level generated by air flowing through the quiet cabin air diffuser assembly of less than 20 dBA, less than 10 dBA, less than 5 dBA, less than 3 dBA, less than 2 dBA, or less than 1 dBA more than ambient aircraft cabin noise, and optionally wherein the sound level includes frequencies of 0.1 kHz, 0.2 kHz, 0.5 kHz, 1 kHz, 2 kHz, 3 kHz, 4 kHz, 5 kHz, 8 kHz, 10 kHz, 12 kHz, 15 kHz, 20 kHz, 0.1-10 kHz, 0.5-4 kHz, 1-4 kHz, 2-4 kHz, 3-10 kHz, 5-10 kHz, greater than 5 kHz, and/or greater than 8 kHz.

B7. The method of any of paragraphs B1-B6, wherein the supplying includes supplying with a speech interference level of less than 55 dBA, less than 52 dBA, less than 50 dBA, less than 48 dBA, less than 46 dBA, or less than 44 dBA.

B8. The method of any of paragraphs B1-B7, further comprising maintaining a pressure in the aircraft cabin of greater than 60 kPa, greater than 70 kPa, greater than 75 kPa, greater than 80 kPa, greater than 90 kPa, greater than 100 kPa, less than 120 kPa, less than 100 kPa, less than 80 kPa, 70-80 kPa, 70-90 kPa, 70-102 kPa, about 90 kPa, about 80 kPa, and/or about 75 kPa.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function. Further, as used herein, the singular forms "a", "an" and "the" may be intended to include the plural forms as well, unless the context clearly indicates otherwise.

The various disclosed elements of systems and apparatuses, and steps of methods disclosed herein are not required of all systems, apparatuses and methods according to the present disclosure, and the present disclosure includes all novel and non-obvious combinations and subcombinations of the various elements and steps disclosed herein. Moreover, any of the various elements and steps, or any combination of the various elements and/or steps, disclosed herein may define independent inventive subject matter that is separate and apart from the whole of a disclosed system, apparatus, or method. Accordingly, such inventive subject matter is not required to be associated with the specific systems, apparatuses and methods that are expressly disclosed herein, and such inventive subject matter may find utility in systems and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the phrases "at least one of" and "one or more of," in reference to a list of more than one entity, means any one or more of the entities in the list of entities, and is not limited to at least one of each and every entity specifically listed within the list of entities. For example, "at least one of A and B" (or, equivalently, "at least one of A or B," or, equivalently, "at least one of A and/or B") may refer to A alone, B alone, or the combination of A and B.

The invention claimed is:

1. A quiet cabin air diffuser assembly comprising:
a duct having a duct inlet, a duct outlet downstream of the duct inlet, and an outlet plenum at least partially defined by the duct outlet;
a grille having a diffuser exit and a grille inlet upstream of the diffuser exit, wherein the grille is coupled to the duct outlet with the grille inlet facing the duct outlet and the outlet plenum; and
a porous flow conditioner positioned at least partially within the outlet plenum and transverse to air flow through the quiet cabin air diffuser assembly, wherein the porous flow conditioner spans at least 50% of an open area of the outlet plenum and at least partially defines an open channel in the outlet plenum that spans at least 10% of the open area of the outlet plenum;
wherein the porous flow conditioner is configured to create backpressure in the duct and to reduce a velocity of air flowing out of the porous flow conditioner toward the diffuser exit relative to a velocity of air flow unaffected by the porous flow conditioner, and wherein the porous flow conditioner is configured to reduce noise generated by air flow through the quiet cabin air diffuser assembly relative to noise generated by air flow unaffected by the porous flow conditioner.

2. The quiet cabin air diffuser assembly of claim 1, wherein the porous flow conditioner is configured to reduce noise generated by air flow through the grille relative to noise generated by air flow unaffected by the porous flow conditioner.

3. The quiet cabin air diffuser assembly of claim 1, wherein the quiet cabin air diffuser assembly is configured to generate a speech interference level of less than 50 dBA when air flows from the duct inlet through the diffuser exit at a flow rate greater than 200 g/min.

4. The quiet cabin air diffuser assembly of claim 1, wherein the porous flow conditioner has an entrance and an exit downstream of the entrance, and wherein the porous flow conditioner is configured to establish an air flow profile at the grille inlet that is more uniform than an air flow profile at the entrance of the porous flow conditioner.

5. The quiet cabin air diffuser assembly of claim 1, wherein the porous flow conditioner is configured to create an air pressure differential of greater than 1 kPa when an air flow into the duct is 2 m/s.

6. The quiet cabin air diffuser assembly of claim 1, wherein the quiet cabin air diffuser assembly is configured to flow air greater than 500 g/min.

7. The quiet cabin air diffuser assembly of claim 1, wherein the porous flow conditioner includes at least one of an open-cell foam, a reticulated foam, and a felt material.

8. The quiet cabin air diffuser assembly of claim 1, wherein the porous flow conditioner is configured to transmit greater than 95% of airborne particles with an effective diameter of less than 100 μm.

9. The quiet cabin air diffuser assembly of claim 1, wherein the porous flow conditioner includes a plurality of layers and wherein the layers are stacked in a direction of average air flow through the duct and the quiet cabin air diffuser assembly.

10. The quiet cabin air diffuser assembly of claim 9, wherein a first layer of the plurality of layers is at least one of a screen panel, a mesh panel, a textile panel, and a fabric panel, wherein a second layer of the plurality of layers is at least one of a porous material, an open-cell foam, a reticulated foam, and a felt material, and wherein the second layer is downstream of the first layer.

11. The quiet cabin air diffuser assembly of claim 1, wherein the porous flow conditioner is friction fit within the outlet plenum.

12. The quiet cabin air diffuser assembly of claim 1, wherein a ratio of an open area of the diffuser exit to an open area of the duct inlet is greater than 4.

13. The quiet cabin air diffuser assembly of claim 1, wherein the porous flow conditioner has an entrance and an exit downstream of the entrance, and wherein the porous flow conditioner defines a cavity that is open to one of the exit of the porous flow conditioner and the entrance of the porous flow conditioner.

14. The quiet cabin air diffuser assembly of claim 1, wherein the open channel is positioned along an inward side of a bend in the duct.

15. The quiet cabin air diffuser assembly of claim 1, wherein the duct includes a baffle plate upstream of the outlet plenum, wherein the baffle plate defines a plurality of channels through the baffle plate, and wherein an average effective diameter of the channels is at least 3 mm.

16. A quiet cabin air diffuser assembly comprising:
a duct having a duct inlet, a duct outlet downstream of the duct inlet, and an outlet plenum at least partially defined by the duct outlet;
a grille having a diffuser exit and a grille inlet upstream of the diffuser exit, wherein the grille is coupled to the duct outlet with the grille inlet facing the duct outlet and the outlet plenum; and
a porous flow conditioner positioned at least partially within the outlet plenum and transverse to air flow through the quiet cabin air diffuser assembly, wherein the porous flow conditioner spans at least 50% of an open area of the outlet plenum and at least partially defines an open channel in the outlet plenum that spans at least 10% of the open area of the outlet plenum;
wherein the porous flow conditioner is configured to create backpressure in the duct and to reduce a velocity of air flowing out of the porous flow conditioner toward the diffuser exit relative to a velocity of air flow unaffected by the porous flow conditioner from the duct inlet, and wherein the porous flow conditioner is configured to reduce noise generated by air flow downstream of the porous flow conditioner.

17. The quiet cabin air diffuser assembly of claim 16, wherein the porous flow conditioner is configured to create an air pressure differential of greater than 1 kPa when an air flow from the duct is 240 L/min.

18. The quiet cabin air diffuser assembly of claim 16, wherein the quiet cabin air diffuser assembly is configured to generate a speech interference level of less than 50 dBA when air flows from the duct inlet through the diffuser exit at a flow rate greater than 200 L/min.

19. The quiet cabin air diffuser assembly of claim 16, wherein the quiet cabin air diffuser assembly is configured to emit air flow from the diffuser exit at a velocity of greater than 2 m/s.

20. An aircraft environmental control system including the quiet cabin air diffuser assembly of claim 16, wherein the aircraft environmental control system is configured to supply air to an aircraft cabin through the quiet cabin air diffuser assembly.

\* \* \* \* \*